United States Patent [19]

Jones

[11] Patent Number: 4,657,568

[45] Date of Patent: Apr. 14, 1987

[54] APPARATUS FOR VOLUMETRICALLY CONTROLLING THE FLOW OF A GAS AND LIQUID MIXTURE

[76] Inventor: James S. Jones, 45 Crown Place, Richardson, Tex. 75080

[21] Appl. No.: 782,971

[22] Filed: Oct. 2, 1985

[51] Int. Cl.⁴ .............................................. B01D 19/00
[52] U.S. Cl. .................................. 55/166; 55/168; 55/204; 137/486
[58] Field of Search ..................... 55/52, 55, 21, 204, 55/167–169, 205, 166; 137/486, 118, 489.5

[56] References Cited

U.S. PATENT DOCUMENTS

| | | |
|---|---|---|
| 863,264 | 8/1907 | Connet . |
| 991,641 | 5/1911 | Plantinga . |
| 1,538,427 | 5/1925 | Earl . |
| 1,640,842 | 8/1927 | Loomis . |
| 1,745,059 | 1/1930 | Rush . |
| 2,633,869 | 4/1953 | Plank . |
| 2,644,482 | 7/1953 | McCallum . |
| 3,193,988 | 7/1965 | Kudlaty . |
| 3,273,313 | 9/1966 | Livesey et al. . |
| 3,346,006 | 10/1967 | Horton . |
| 3,358,424 | 12/1967 | Magorien . |
| 3,395,726 | 8/1968 | Cross et al. . |
| 3,630,002 | 12/1971 | Burrus ........................ 55/168 X |
| 3,788,040 | 1/1974 | Bragg et al. . |
| 3,895,927 | 7/1975 | Bournham, Sr. . |
| 3,950,943 | 4/1976 | Paddock et al. ................ 137/118 X |
| 3,978,681 | 9/1976 | Kjelgaard et al. . |
| 3,990,432 | 11/1976 | Haynes et al. . |
| 4,175,374 | 11/1979 | Wiesboeck . |
| 4,194,893 | 3/1980 | Woodhouse et al. ................. 55/168 |
| 4,197,097 | 4/1980 | Magorien et al. . |
| 4,201,555 | 5/1980 | Tkach ............................. 55/21 X |
| 4,210,171 | 7/1980 | Rikuta . |
| 4,300,919 | 11/1981 | Lewis et al. . |
| 4,340,340 | 7/1982 | Brown et al. . |
| 4,364,409 | 12/1982 | Jones . |

OTHER PUBLICATIONS

*Extra Flo* ®, *What it Does for the Application of Ammonia* by Continental NH₃ Products Co., Inc.
*B-9500 Meter Matic* by Continental NH₃ Products Co., Inc.
Squibb Taylor Flo-Trol 1645 pictured in *Fertilizer Progress*, Sep.–Oct. 1980, p. 19.

*Primary Examiner*—Charles Hart
*Attorney, Agent, or Firm*—Richards, Harris, Medlock & Andrews

[57] ABSTRACT

Apparatus for volumetrically controlling a liquefied gas, such as agricultural ammonia, receives liquefied gas from a suitable pressure vessel through conventional hoses and fittings and removes the energy represented by vapor due to the pressure drop from the vessel to the metering means by either refrigeration or vapor stripping or both.

6 Claims, 3 Drawing Figures

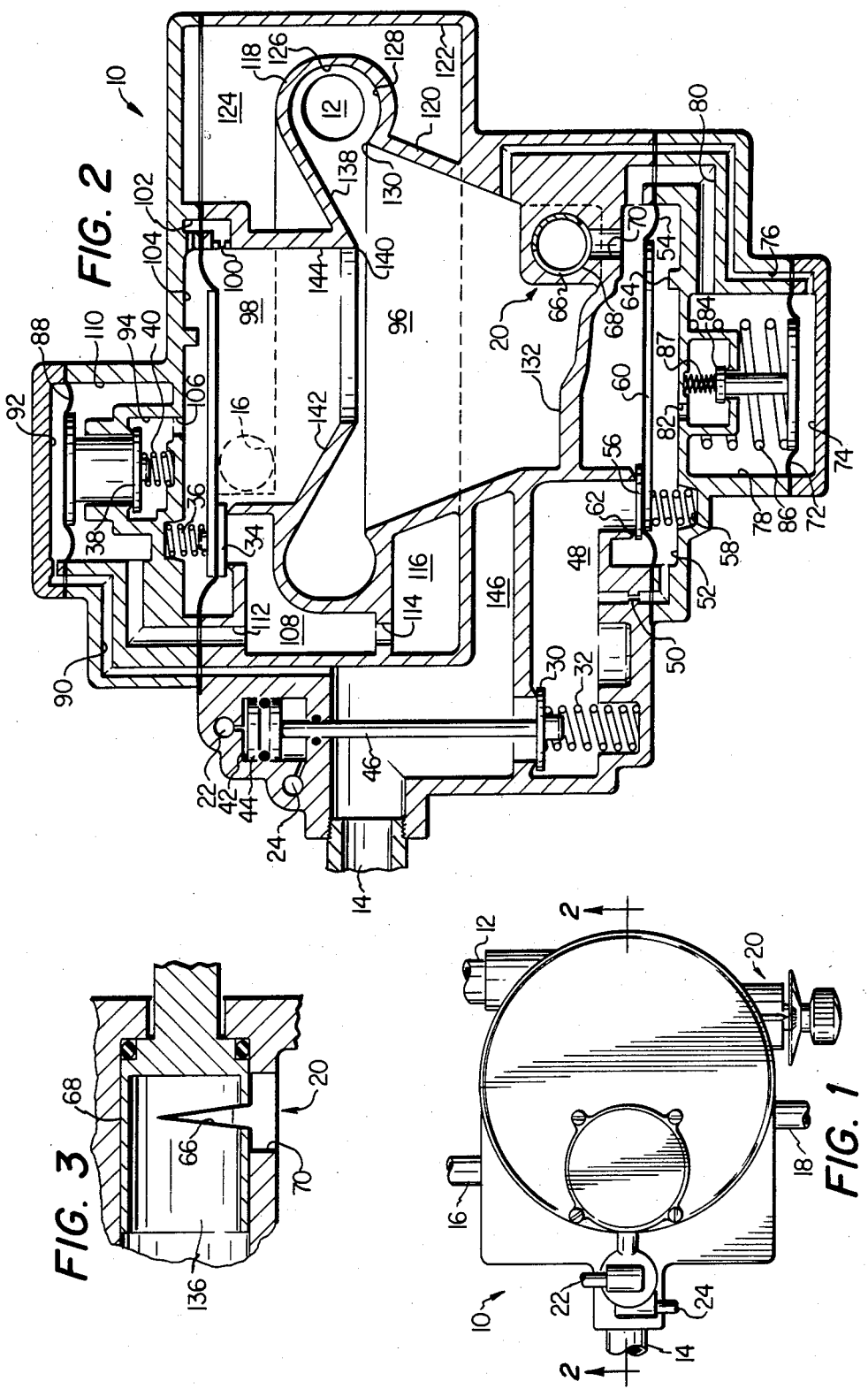

4,657,568

APPARATUS FOR VOLUMETRICALLY CONTROLLING THE FLOW OF A GAS AND LIQUID MIXTURE

TECHNICAL FIELD

This invention relates to systems handling liquefied gases where the presence of large quantities of vapor is detrimental to the desired operation of the system, and more particularly but without limitation, to liquid agricultural anhydrous ammonia systems. BACKGROUND ART The preferred environment of the present invention is described in my U.S. Pat. No. 4,364,409 issued Dec. 21, 1982, the disclosure of which is incorporated herein by reference.

The field application rates of agricultural ammonia have drastically increased over the past few years with increased swath widths and larger tractors; however, the ability to volumetrically control the application of ammonia has deteriorated due to additional hardware required between the tank and the controlling apparatus. Ammonia is a vapor that is stored as a liquid in a pressure vessel due to its vapor pressure and is at its boiling point at normal ambient temperatures. During application, pressure in the vessel varies between 50 and 130 PSIG. Withdrawal from ammonia wagons is through a dip tube located at the top, and when the liquid reaches the withdrawal valve it is a superheated liquid and becomes more superheated as it passes through the required valves and hoses. The ammonia arrives at the control apparatus with an unidentifiable and variable vapor/liquid volume ratio, and the vaporeous component of the ammonia flow makes the volumetric control of the flow inaccurate and unpredictable.

Therefore, there presently exists a need for an apparatus which separates the vapor and liquid components of ammonia prior to volumetric control of the liquid. The vapor content increases with system demand and decreases with ambient temperature, so it is essential that the flow of vapor from the apparatus be throttled in response to these factors.

SUMMARY OF THE INVENTION

This invention provides liquefied gas that is reasonably free of vapor prior to volumetric control. Energy is removed from the gas to lower the liquid temperature by either refrigeration or vapor stripping or both. Volumetric control means is arranged to provide ample system refrigeration at very low demands. The system pressure downstream from the volumetric control means is sensed to open vapor dump outlets at progressively higher downstream pressures and progressively reduce the dump pressures with increased ambient temperatures by using the vapor pressure acting to close the dump.

The apparatus has in combination means to receive product, preferably but not necessarily ammonia, which may have a liquid volume as low as 20% of the total volume. The apparatus changes the flow path to circular where the liquid is separated from the vapor and continues its circular path maintaining much of its kinetic energy. The liquid spills over an edge formed by the lower inner portion of a circular receiver. Liquid flows down a main chamber inner wall that is conical in shape and has a helical floor that descends downward in the direction of flow into an exit. The exit is placed on a tangent to receive the liquid in such a way as to maintain as much kinetic energy as practical.

The apparatus has means to remove and control the flow of vapor from the upper center portion of the main chamber and throttle it into dump chambers that surround the upper and lower portions of the circular receiver and the upper portion of the conical chamber, thereby refrigerating these surfaces. The apparatus has means to volumetrically control liquid flow which is placed in the lower portion of the apparatus. The refrigeration that results from metering at lower demand levels is ample to assure accurate volumetric control.

BRIEF DESCRIPTION OF THE DRAWINGS

A more complete understanding of the invention and its advantages will be apparent from the Detailed Description taken in conjunction with the accompanying Drawings in which:

FIG. 1 is a top view of the preferred embodiment of the present invention;

FIG. 2 is a sectional view of the apparatus of FIG. 1 taken along line 2—2 of FIG. 1; and FIG. 3 is a partially broken away side view of the metering control used in the apparatus of FIG. 1.

DETAILED DESCRIPTION

Referring Initially to FIG. 1, apparatus 10 has an inlet 12, a liquid outlet 14, vapor dump outlets 16 and 18, metering control knob 20 and suitable hydraulic connections 22 and 24 to operate the apparatus. Inlet 12 is adapted for connection to, for example, a source of ammonia such as a conventional towable pressure tank used in agricultural applications. Outlets 14, 16 and 18 are adapted for connection to, for example, conventional ammonia injection apparatus.

Referring now to FIG. 2, apparatus 10 is shown closed to the flow of ammonia. The liquid leg of the apparatus, ending at liquid outlet 14, is closed by shutoff valve 30 in cooperation with spring 32 and the pressure across the shutoff valve 30. The vapor dump outlet 16 and dump outlet 18 (not shown) are closed by dump valve 34 in cooperation with spring 36 and at dump leg control valve 38 in cooperation with spring 40.

When ammonia is required, the operator opens a valve to pressurize the upper compartment of the shutoff cylinder 42 through hydraulic connection 22 causing the piston 44 to move downward acting through pin 46 and fully open shutoff valve 30. This allows the ammonia in the lower shutoff chamber 48 to flow through liquid outlet 14 by way of valve 30. Ammonia flows across throttle control orifice 50 providing a pressure loss in throttle control chamber 52 and causing a pressure unbalance across throttle diaphragm 54 tilting open throttling valve 56. Throttle valve 56 is offset from the center of the diaphragm 54 and is closed by spring 58 and the pressure difference across it. With a pressure unbalance, diaphragm 54 is urged downward but is held in place under the valve 56 causing diaphragm disc 60 and valve 56 to tilt using the outer portion 62 of the valve seat as a fulcrum. This tilting continues with increased flows until the diaphragm disc 60 comes in contact with rib 64 which then becomes the fulcrum point causing the diaphragm disc 60 and valve 56 to tilt away from the seat to satisfy further demand increases.

Referring now to FIGS. 2 and 3, the velocity of flow through the apparatus is read by the pressure difference across a metering point formed by the metering slot 66 of metering barrel 68 and metering port 70 and acting across throttle control diaphragm 72. The upstream or high pressure side of diaphragm 72 is read in lower control chamber 74 through passage 76, and the downstream pressure is read in chamber 78 by way of passage 80. Communication between chamber 78 and control chamber 52 through passage 82 is closed by throttle control valve 84. Control valve 84 remains closed by spring 87 with ample force to allow throttling valve 56 to fully open so at all operating conditions throttling valve 56 can be considered normally open. Valve 56 continues to open until the velocity across the metering point formed with slot 66 and port 70 creates ample pressure difference across diaphragm 72 to overcome the force of spring 86, thereby opening control valve 84 to replenish the ammonia leaving control chamber 52 by way of orifice 50. Valve 84 has the capacity to allow valve 56 to close; therefore, valve 56 will function to allow a velocity across the metering port 70 that is a function of metering springs 86 and diaphragm 72 regardless of the total demand of ammonia. The vapor dump valve 34 has the identical tilting action as the throttle valve 56 except it is normally closed by spring 36 and the system pressure across it.

The metered liquid ammonia flows to the ground from the liquid outlet 14 through conventional hoses, manifolds, and knives producing a back pressure at liquid outlet 14 that is related to the quantity of ammonia flowing. This back pressure is read by the dump control diaphragm 88 through passage 90 between outlet 14 and the upper control chamber 92. Then the resistance to flow of ammonia at outlet 14 produces ample pressure in upper control chamber 92 by way of passage 90 acting on control diaphragm 88 to overcome spring 40 and the pressure closing control valve 38, to open a flow from vapor chamber 98 to the controlled pressure dump chamber 108 by way of orifice 100, passage 102, control chamber 104, passage 106, into chamber 94, by valve 38 into chamber 110 and through passage 112. The resistance to flow through orifice 100 drops the pressure in control chamber 104 which opens the dump valve 34 allowing a flow from upper chamber 98 into chamber 108 by way of valve 34. The resistance to flow of orifice 114 is read in chamber 110 by way of passage 112 to bring about a pressure balance of diaphragm 88, spring 40 and valve 38.

The system pressure is related to the ambient temperature and is read by the rather large control valve 38 which delays the initial opening of the dump valve 34, as well as reducing the pressure to the dump orifice 114, as the system pressure increases. The pressure in chamber 108 is related to the ambient temperature (read by valve 38) and to the metered ammonia flowing as read by diaphragm 88 and has a pressure function as follows: The downstream pressure of the metered ammonia, as read at liquid outlet 14, multiplied by the area of dump control diaphragm 88, minus the area of the dump control valve 38, multiplied by the system pressure, plus the force of closing spring 40, divided by the area of diaphragm 88, minus the area of valve 38.

A replaceable dump control orifice 114 is sized to set up the apparatus for different crops. The small grains such as wheat, rye, etc., use many more knives for a given swath width than the heavier grains such as corn and feed sorghums, but the heavier grains require more nitrogen per acre than the small grains. The use of restricting orifices at the manifolds for each knife to aid in the distribution of the ammonia is common practice for the small grains. These orifices increase the pressure at the liquid outlet 14 requiring a smaller dump control orifice 114 for a given output. When the pressure at liquid outlet 14 is sufficient to open dump control valve 38, which in turn opens vapor dump valve 34, suitable pressure will be in chamber 110 to provide a balanced force across the dump control means.

The ammonia across dump valve 34 can be saturated or supersaturated vapor. The expansion across valve 34 will reduce the temperature of the ammonia in chamber 108 with another temperature drop with the expansion across orifice 114. The saturated ammonia across valve 34 represents the energy required to reduce the liquid temperature from the tank to the apparatus. The liquid particles accompanying the vapor will be used to lower the system's temperature as the vapor moves through the lower dump chamber 116 that surrounds the lower section of receiver 118 and the upper conical portion 120 of main chamber 96. Vapor then flows up through riser 122 into upper dump chamber 124 that surrounds the upper portion of receiver 118 on its way to dump outlets 16 and 18.

The ammonia entering the receiver 118 through inlet 12, which is on a tangent with the receiver 118, continually changes direction inwardly which separates the liquid from the vapor. The liquid continues its circular path around the inner vertical retaining wall 126 and the lower portion 128 with a continual liquid spill over spill edge 130. Liquid continues its circular downward path to the helical floor 132 that descends downward in the direction of liquid flow and enters the bore 136, shown in FIG. 3, of the metering barrel 68. The metering barrel 68 is positioned tangentially at the lower portion of the helical floor 132 to receive the liquid so as to maintain as much of the kinetic energy as is practical.

The ammonia removed from the system through the vapor dumps 16 and 18 is fed into the ground through an appropriate number of larger outlets located at the rear of conventional knives. The pressure in riser 122 and chamber 124 is therefore related to the resistance through the dump legs and is usually under 10 PSIG, providing a temperature of $-28°$ F. to $-8°$ F.

This reduced temperature refrigerates the walls separating the receiver 118 and the main chamber 96 from the riser 122 and chamber 124. The ammonia vapor in the upper portion of main chamber 96 comes in contact with the colder surface 138. The vapor condenses and flows downward to lip 140, where it is joined with condensation from surfaces 142 and 144 of vapor chamber 98 and drips off the lip 140 to join the liquid in the lower portion of main chamber 96.

The surface of the conical portion 120 of main chamber 96 is cooled by riser 122, supercooling the liquid ammonia as it moves downward and providing an ideal condition for absorbing any of the vapor that may come in contact with the liquid. At higher ambient temperatures and lower outputs, the dump leg of the apparatus will remain closed, depending entirely on the refrigeration due to metering to remove energy from the system. Expansion of liquid for metering takes place at valve 56 where there is an instant reduction of temperature to the dew point of ammonia at the vapor pressure in chambers 48 and 146 which refrigerates a lower portion of main chamber 96.

Whereas the present invention has been described with respect to a specific embodiment and environment thereof, it will be understood that various changes, modifications and other uses of the invention will be suggested to one skilled in the art and that this invention encompasses such changes, modifications and additional uses of the invention as fall within the scope of the appended claims.

I claim:

1. Apparatus for volumetrically controlling the flow of a vapor and liquid mixture comprising:
   an inlet and at least two outlets, a first outlet being a liquid outlet and the second outlet being a vapor outlet;
   volumetric liquid control means for maintaining a predetermined constant volume of liquid flowing between the inlet and liquid outlet independent of changes in liquid pressure;
   separation means for separating liquid from vapor and located between the inlet and the liquid control means;
   liquid back pressure sensing means for sensing liquid back pressure downstream of the volumetric liquid control means;
   vapor dump control means for controlling the dumping of vapor through the vapor outlet and located between the separation means and the vapor outlet;
   vapor pressure sensing means for sensing pressure between the separation means and vapor control means; and
   the vapor dump control means adapted for operating in response to the liquid back pressure sensing means and vapor pressure sensing means to progressively increase vapor flow through the vapor outlet at higher liquid back pressures.

2. The apparatus of claim 1 wherein the liquid back pressure sensing means senses the liquid back pressure between a liquid shutoff means and the liquid outlet to open the vapor dump control means, the vapor pressure sensing means is adapted to oppose the pressure sensed by the liquid back pressure sensing means, and the vapor dump control means cooperates with the vapor pressure sensing means to control the vapor flow rate in relation to the system pressure.

3. The apparatus of claim 2 wherein the separation means includes:
   a circular horizontal receiver with an inlet disposed tangential to a receiver such that the liquid in the receiver continually changes direction inwardly;
   a spill ring formed by the upper edge of a substantially conical section depending from the receiver;
   a floor at the bottom of the conical section being downwardly helical in the direction of flow; and
   an outlet set on a tangent to the floor to receive liquid such that it retains its kinetic energy.

4. The apparatus of claim 3 wherein:
   the liquid control means is adjustable by a metering slot in a metering barrel so arranged to receive unmetered liquid into the bore of the barrel where it flows across the metering slot through a metering port;
   means to read the velocity across the metering port is provided;
   the liquid velocity is controlled by a throttle valve mounted off-center on a throttle diaphragm such that a pressure difference across the diaphragm causes the diaphragm to tilt and thereby open the throttle valve;
   the low pressure side of the throttle diaphragm has communication with a chamber between the throttle valve and a shutoff valve across an orifice and the throttle valve is thereby normally open;
   the control means further includes a spring loaded throttle control diaphragm operating a normally closed throttle control valve;
   the opening side of the throttle control diaphragm communicates with a point upstream of the metering barrel;
   the closing side of the throttle control diaphragm communicates with the downstream side of the metering barrel; and
   the throttle control valve opens into the low pressure side of the throttle diaphragm, such that the greater the velocity across the metering port, the greater the flow across the throttle control valve replenishing liquid on low pressure side of throttle diaphragm to close the throttle valve, and the throttle is thereby positioned valve to maintain a constant velocity across the metering barrel.

5. The apparatus of claim 4 wherein:
   a vapor dump chamber surrounds the separation means such that dumped vapor on its way to the vapor outlet can receive energy from the unmetered liquid.

6. The apparatus of claim 5 wherein:
   the chambers associated with the liquid outlet and the liquid control means have at least one connecting and common wall with a portion of the conical section of the receiver such that energy removal from the unmetered ammonia is provided at low demands regardless of vapor flow.

* * * * *